June 5, 1934.  K. P. McELROY  1,961,902
MAKING BASE EXCHANGE SILICATES
Filed Dec. 22, 1931
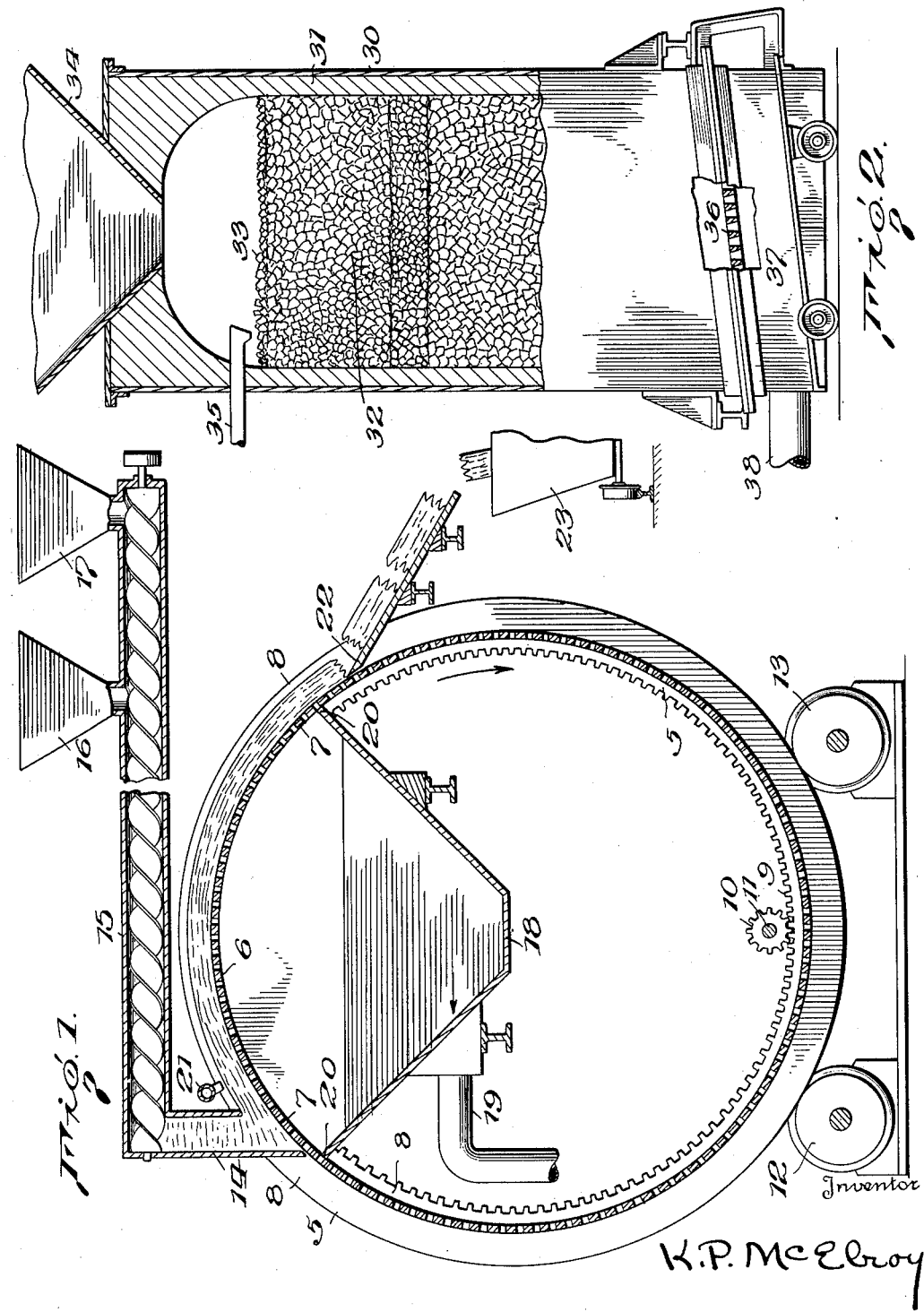

Patented June 5, 1934

1,961,902

UNITED STATES PATENT OFFICE 1,961,902

MAKING BASE EXCHANGE SILICATES

Karl P. McElroy, Washington, D. C., assignor to The Permutit Company, New York, N. Y., a corporation of Delaware Application December 22, 1931, Serial No. 582,667

18 Claims. (Cl. 23—111)

This invention relates to making base exchange silicates; and it comprises a method of making base-exchange silicates or zeolites wherein a pervious bed of a fuel-containing mixture of alkali with material containing alumina or iron oxid, or both, and silica in the proper proportions for making a zeolite is established, the fuel in the upper face of the bed is ignited and a current of air is passed through the bed from the ignited upper face in such manner as to produce a downwardly traveling zone of intense combuston and high temperature passing to the lower face, the resulting porous slag like or glass like mass being then quickly cooled and hydrated and leached to remove excess alkali, some or all of this excess alkali being usually returned for making the initial mixture; all as more fully hereinafter set forth and as claimed.

As a mineralogical word, "zeolite" is applied to certain native crystallized double silicates of alkali and alumina; or "aluminosilicates" of alkali. In the water softening art however, the term has come to mean any granular material or "base exchange silicates" capable of removing hardness from water; capable of exchanging contained sodium for the calcium and magnesium of hard water. All these commercial zeolites however, with the exception of glauconite, have the general chemical composition of the mineralogical zeolites; they are double silicates of alumina and alkali.

In the original method of making zeolites for softening water, a mixture containing alumina, silica and sodium carbonate, or soda ash, was melted to form a glass; the amount of soda ash used being much in excess of the amount ordinarily regarded as necessary for fluxing silica and silicates. The glass made in melting was cooled, granulated and leached; leaving an extremely porous hydrated material of good rigidity and hardness; a combination of properties highly desirable in water softening apparatus. The excess of soda employed in making the glass was removed in this leaching operation, appearing now however mostly as NaOH in lieu of Na$_2$CO$_3$. The leach liquid contained a large part of the alkali and a less proportion of the silica of the original mixture. In one typical example of this early practice there were present in the melting mixture Al$_2$O$_3$, SiO$_2$ and Na$_2$CO$_3$ in the molecular ratio of 1:10:10. The crystalline hydrated solid product or "artificial zeolite", left by the leaching had the approximate composition,

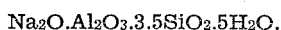
Na$_2$O.Al$_2$O$_3$.3.5SiO$_2$.5H$_2$O.

Because of the highly alkaline character of these melts they were extremely aggressive on the furnace, the walls of the furnace suffering much more corrosion than occurs in making an ordinary glass melt, or even a water glass melt. The glassy product obtained was derived to a substantial extent from the brick of the furnace chamber. While the glass process, as it was called, made excellent zeolites it was unduly expensive; much of the expense being in the upkeep of equipment. Losses of soda and silica were high. Fuel consumption in the melting operation was a large item of expense.

In the present invention a more economical method of making a glassy material suitable for leaching to produce commercial zeolites is provided. This is done by causing reaction of alumina, silica and alkali to take place in an operation analogous to ordinary "sintering" as that term is understood in metallurgical arts but differing in that the product is more in the nature of a glass or a slag than of a sinter. The materials for making the zeolite are well mixed with each other and the mixture, which is often granulated, is then further admixed with a proper amount of fine fuel. The mixture is formed into a layer and the fuel ignited on the upper face, a traveling zone of transitory intense combustion and intense temperature being sent toward the lower face of the layer by a draft of air. The temperatures are high enough to produce local fusion as the zone passes but do not endure long enough to allow any substantial flow of the resultant glass. As the fuel, ordinary coke breeze may be utilized in particle sizes and shapes which make the mixture pervious. A layer of this mixture can be formed on a chain grate stoker or any other suitable perforated device and suction applied from below. On igniting the top surface layer with a flame or otherwise a quick local combustion of the admixed coke takes place; the combustion being so rapid that local temperatures are attained well above the melting point of the materials to be treated while the molten granules have no time to coalesce or fuse into a continuous body of glass or molten bath. Cooling by following air occurs at once as the fuel disappears. The result can be a sort of botryoidal mass of fused granules united at their meeting faces. There being no molten bath in contact with brickwork, there is, naturally, no corrosive action to be feared and the final material is not partly derived from the brickwork as in the prior art of making zeolites in a glass furnace. The product represents the charge put into the apparatus. Continuous rather than batchwise operation is advantageous and is practicable with only slightly modified commercial types of "sintering machines".

Where batch or small scale operation is wanted the same process can be operated in a shaft; a charge being fired at its upper surface and a downdraft of air used.

The cooled product formed in the heating operation is broken up and leached with water, whereupon the alkali alumino-silicates formed in the heating operation are hydrated and become granular crystalline zeolitic bodies highly active in base exchange and physically strong and durable. They are like those formed in using a glass furnace but can be made of more accurate composition. The leachings and washings contain soluble alkali and silica and these water extracts can be employed in making up a granular initial mixture containing alumina, silica and alkali to be used in a succeeding sintering operation. So doing, the excess of alkali and silica needed in the mix are circulated and used cyclically with consequent economy of materials.

As raw materials I may use soda ash and any conveniently available alumino-silicious material such as ordinary clay or shale or feldspar or mixtures of these. Clays containing molecular ratios between 5 and 6 $SiO_2$ to 1 $Al_2O_3$ are cheaply available in many localities. Such a clay is a desirable and usually economical source of alumina and silica for zeolite formation. Instead of clay, or mixed with clay, the mineral glauconite or greensand is a suitable raw material. In this natural base exchange mineral both iron and alumina are present as well as silica and some alkali, and I have found that a glassed product of greensand and alkali when treated with water becomes a hydrated granular crystalline material of zeolitic nature which has in high degree the chemical and physical properties useful in regenerative base exchange water softening and for analogous purposes. The alkali for the zeolite is usually provided in the form of soda ash or caustic soda and this is intimately mixed with the clay, greensand and other alumina-silica material. Sufficient alkali should be present in the mixture to flux or slag the silica and alumina of the clay; enough to form a good glass but not enough to make a free flowing molten mixture. Usually the alkali provided in the raw mix is equal to about one molecule of $Na_2O$ for each $SiO_2$ and for each $Al_2O_3$ present; or just a little less. With this large proportion of soda present a glass or slag is formed quickly in the heating operation, the slag containing compounds of soda, alumina and silica which upon the subsequent leaching with water are converted into highly porous hydrated zeolites. High porosity is desirable in a zeolite granule provided the structure is rigid.

In preparing a mixture to be sintered it has been found advantageous to form the mixture into granules or pellets more or less corresponding in size to that of the zeolite granule ultimately wanted. In making pellets it is desirable to use a blending liquid, which may be water but is more advantageously the leach liquor from a previous operation. As already stated this liquor contains alkali and dissolved silica or sodium silicate and provides in the sintering mixture an excess of both alkali and silica over the amounts of these components required for the zeolite formed in the leaching step of the process. So working, the leachings may supply substantially all of the excess alkali and silica put into the sintering mixture, any losses or other deficiency in alkali being made up by additions of soda ash to this mixture. $K_2O$ is equivalent to $Na_2O$ for the present purposes but with potassiferous raw materials it is often desirable to withdraw leachings for use elsewhere, replenishing with soda ash.

Where the reaction mixture is formed into pellets, these pellets dried and then mixed with coke, the sintered product is, or may be, more or less in the nature of agglomerated globules. If, on the other hand, the coke is mixed uniformly with the other materials, a cake is formed which upon firing gives a sort of honeycomb structure, capable of being broken up into flaky granules of the right size. For the heating operation, the proportion of coke in the mixture, the thickness of the layer ignited and the speed of the air current through the ignited layer should be correlated to give the greatest possible ratio of $CO_2$ to CO in the effluent combustion gases.

The mixture submitted to sintering should always be dry and as hot as is convenient thereby facilitating uniform propagation of combustion and giving economy of coke and a less cellular glass cake. With dried materials, ordinarily about 20 per cent of carbon is required for firing. Petroleum coke, which has substantially no ash is better than ordinary coke for the present purpose, but such ordinary coke or any other fine fuel may be used. The ash of the fuel mostly remains in the cavities left in firing and goes into the leach water. It may be recovered and added to a raw mix.

While I have described the return of the leachings for making up the original mix, and this I regard as a most economical procedure, yet as stated the leachings may be otherwise utilized and all the alkali supplied as soda ash. In using potassiferous materials like feldspar or glauconite and also many clays, there is a production of potash; this potash going into the leachings. In utilizing glauconite in the manner described, the operation gives leach liquors with a considerable proportion of potash.

With low ratios of fuel in the mix or with combustion retarded, the clay and soda react without fusion to form a granular fritted mass which upon leaching with water becomes hydrated to a substance resembling zeolites in base exchange activity. In such a case, the proportion of soda in the sintering mixture may be so decreased that the alkali extracted in the leaching becomes small in quantity, only a small excess of alkali being required in the heating step.

In the accompanying drawing I have shown more or less diagrammatically apparatus arrangements useful in the performance of my process. In this showing, Fig. 1 is a side elevation, partly in section, of a continuously operating apparatus treating a moving layer; the apparatus being analogous to a common commercial type of "sintering machine" but used to cause fusion rather than sintering;

Fig. 2 is an elevation, partly in section of a shaft type furnace for operation on a stationary bed.

In the machine of Fig. 1, a wheel 5 is formed by an annular grate 6 having perforations 7, the two edges of grate 6 being fitted into perpendicular flanges 8 forming the two sides of an open receptacle with grate 6 as the bottom. The side flanges 8 extend beyond grate 6 and are provided with teeth 9 forming annular racks engaging with pinions 10 set upon a common shaft 11. This shaft is adapted to be rotated by power means (not shown) and serves to rotate the wheel by means of the pinions and racks. As shown, the wheel is supported by having the two flanges rest at their outer edges upon two pairs of grooved rollers 12 and 13.

The wheel 5, as shown, is arranged to be fed with material by a distributor 14 which is adapted to spread the fed material across the grate 6 as it revolves; the material being fed to the distributor 14 from a mixer 15 taking materials through hoppers 16 and 17.

A stationary suction box 18 is arranged within the wheel. This suction box may be connected through conduit 19 to an exhaust fan. The box 18 makes at its top sides 20 a sufficiently tight moving joint with the toothed flanges 8 to permit application of suction through the grate perforations 7 upon the body of material spread upon the grate. No high degree of suction is required. An igniter 21, which may take the form of gas or oil jets, extends across the grate at a proper height near the distributor 14. At a suitable point upon the grate 6, a chute 22 may be arranged to remove "sinter" from the wheel and to deliver it into a vehicle 23.

In the operation of the wheel to form a glass or slag containing zeolite-forming material, a mixture of granular coke with thoroughly dried granules or pellets of alumino-silicate and alkali is made in mixer 15 and is spread in a layer by means of distributor 14 upon the grate 6 between the side flanges 8; the wheel being slowly and continuously rotated clockwise with suction applied to the suction box 18 and with igniter 21 lighted. The coke starts burning at the top of the layer near the distributor, air is drawn downwardly through the layer as it moves with the wheel and combustion of the coke proceeds through the layer as a moving zone until the coke has burned away. The combustion produces a high temperature as it proceeds and as the coke disappears the following downwardly passing air current cools the material progressively downward. There is thus a quick progressive development of heat followed by a quick cooling action. The proportion of coke in the mixture, the thickness of the layer, the speed of rotation of the wheel and the rate of the air current are correlated to effect melting of the granular alkaline material followed by cooling and solidification of the melted granules without time being afforded for free flow or formation of a molten mass. Conditions are adjusted to complete the melting, solidification, and partial cooling of the material as it travels with the wheel from the distributor 14 to the point where it is stripped from the wheel over chute 22.

In a specific embodiment of my invention, an ordinary clay containing 17 per cent alumina and 5 per cent ferric oxid, 64 per cent silica and 2 per cent potash with fractional per cents of lime and magnesia was mixed with soda ash in a ratio of 1.25 parts of soda ash to one part of clay by weight. The mixture contained approximately, in molecular proportions, $0.34Al_2O_3$, $0.16Fe_2O_3$, $5.44SiO_2$, $0.11K_2O$, $6Na_2CO_3$. The clay and soda ash, were intimately mixed and granulated as dry, fine powders using a little water to make pellets of about wheat size. The pellets were then thoroughly dried and mixed with about one quarter their weight of fine coke of about the same grain size as the pellets and the mixture was charged on the sintering machine in a layer about 3 to 5 inches thick. The top face of the layer was ignited by a gas flame as the layer was slowly moved forward by the machine and air sucked downwardly through the layer. The pellets were heated to a white heat by the local combustion of the coke in cavities in the bed and melted to individual slag-like globules held together at the faces. As the coke burned off, the air current cooled the globules before they had time to coalesce. The combustion and melting reaction followed by cooling and solidification were propagated downwardly symmetrically through the layers by the air current as the layer moved forward and the conditions were so co-ordinated that a completely solidified comparatively cool slag-cake was removed from the machine with continuous delivery.

The slag-cake methodically leached first with boiling water, and then with cold water and was then broken up to about the ultimate grain size. About five sixths of the alkali of the original mixture and about one quarter of the silica were dissolved leaving undissolved a porous, hard, rigid, granular zeolite having a composition approximating $$Na_2O.Al_2O_3(Fe_2O_3).4SiO_25H_2O.$$

The zeolite was further washed, drained and somewhat dried and was then ready for use in a water softener. The leach liquor was used in making up the mixture for succeeding sintering operation. It supplied the greater part of the alkali required to flux the clay and added substantially to the silica in the mixture. Little soda ash was used over that theoretically required to form the final zeolite; about one $Na_2O$ for each $Al_2O_3$ and $Fe_2O_3$.

In the furnace of Fig. 2, which may comprise a circular casing 30, with a refractory heat insulating lining 31 in batchwise operation, a stationary bed 32 of the zeolite forming materials mixed with coke may be established with a layer 33 of coke alone at the top of the bed. The materials are charged into the furnace through the hopper 34 at the top and this hopper is left open to the air during operation. The coke layer at the top is ignited by a jet of burning gas or oil introduced through an igniting tube 35. The bed rests upon a dumping grate 36 at the bottom of the shaft and a removable suction box 37 is attached to the furnace below grate 36, the box having a conduit 38 leaving to an exhaust fan. When the suction box is detached, grate 36 may be dumped and the furnace charge removed. Upon ignition of the coke layer 33 with a draft of air being pulled downwardly through the bed, combustion of the coke and melting of the alumino-silicate and alkali granular mixture proceeds downwardly and as the coke burns away the downward current of air cools the melt before it has time to flow as a molten body. The body is left in the furnace as a mass of mingled globules which readily breaks up to permit dumping from the furnace, the passage of air being prolonged for a sufficient time to effect adequate cooling of the furnace charge for purposes of removal from the furnace. The operation of the furnace can be regulated to produce a product similar to that of the sintering machine.

What I claim is:—

1. In the manufacture of base exchange silicates by the fusion of materials containing alumina and silicates with alkali, the improved process which comprises igniting in the presence of air a pervious mixture of fuel, a material containing alumina and silica and an alkali, passing air through the mixture to heat said materials by combustion of the fuel, thereby producing a sintered mass, and subsequently leaching the sintered material with water.

2. In the manufacture of base exchange silicates by the fusion of materials containing alumina and silicates with alkali, the improved process which comprises igniting in the presence of air a pervious mixture of fuel, clay and alkali, passing air into the mixture to heat said materials by combustion of the fuel, thereby producing a sintered mass and subsequently leaching the sintered material with water.

3. In the manufacture of base exchange silicates by the fusion of materials containing alumina and silicates with alkali, the improved process which comprises making a mixture of a powdered material containing alumina and silica with alkali, granulating said mixture and mixing the granulated mixture with granulated fuel, igniting the final mixture in the presence of air, passing air through the ignited mixture to burn the fuel and form a sinter, cooling the sinter and extracting it with water.

4. In the manufacture of base exchange silicates by the fusion of materials containing alumina and silicates with alkali, the improved process which comprises making a mixture of finely powdered materials containing alumina and silica with alkali and water, granulating and drying said mixture and mixing the granulated mixture with granulated fuel, igniting the final mixture in the presence of air, passing air through the ignited mixture to burn the fuel and form a sinter, cooling the sinter, extracting it with water and returning said water extract to a mixture containing alumina, silica and alkali for a succeeding sintering operation.

5. In the manufacture of base exchange silicates by the fusion of materials containing alumina and silicates with alkali, the improved process which comprises forming a pervious mixture of material containing alumina and silica with alkali and solid carbonaceous fuel, quickly burning the fuel of said mixture with air to produce a reacting temperature in said mixture, quickly cooling the sintered mass so produced and treating the cooled sintered material with hot water.

6. In the manufacture of base exchange silicates, by fusion processes, the improved process which comprises forming a pervious mixture of finely divided greensand with alkali and solid carbonaceous fuel, quickly burning the fuel of said mixture with air to produce a reacting temperature in said mixture, quickly cooling the sintered mass so produced and extracting the cooled sintered material with water.

7. In the manufacture of base exchange silicates by the fusion of zeolite forming materials, the improved process which comprises establishing a layer of a pervious mixture of zeolite-forming materials capable of forming base exchange silicates upon fusion and fuel, igniting the layer at the upper face, passing a current of air downwardly through said layer, and thereby propagating a zone of heat downwardly through the layer and then cooling it.

8. In the manufacture of base exchange silicates by the fusion of zeolite forming materials, the improved process which comprises establishing a layer of a pervious mixture of zeolite-forming materials capable of forming base exchange silicates upon fusion and fuel, moving said layer longitudinally, igniting the moving layer at its upper face and passing a current of air downwardly through said layer in a direction substantially at right angles to its direction of movement.

9. In the manufacture of base exchange silicates by the fusion of zeolite forming materials, the improved process which comprises establishing a stationary bed of a pervious mixture of zeolite-forming materials capable of forming base exchange silicates upon fusion and fuel, igniting the upper surface of the bed and passing a current of air downwardly through said bed to first progressively heat and then to cool the bed.

10. In making highly alkaline glassy materials from which zeolites can be formed by hydration, a process which comprises making a dry granular mixture of zeolite forming materials containing alumina and silica with an excess of alkali and with an admixture of granular fuel, forming the mixture into a layer on a pervious hearth, producing even ignition of the upper face of the layer and passing air downward through the layer in such a manner as to produce a downwardly passing zone of combustion and temporary local high temperature, cooling the mass and treating it with water.

11. In the manufacture of base exchange silicates by fusion of a mixture of materials containing alumina and silica and an alkali, the improved process which comprises adding a fuel to said mixture to form a composite pervious body and then effecting fusion by igniting the fuel in said body, passing air through the ignited mixture to burn the fuel and form a sinter and continuing the passage of air after the combustion of the fuel is completed to quickly cool the sintered mass.

12. In the manufacture of base exchange silicates by fusion of a mixture of materials containing alumina and silica and an alkali, the improved process which comprises progressively and locally heating successive portions of said mixture to reaction temperature, the required heat being generated in situ by the combustion of a fuel contained in said mixture, and quickly cooling the sintered portions of the mass as the zone of local high temperature progresses through the mass.

13. The improved process of claim 12 in which said heating is effected by burning fuel in situ in the said mixture with the aid of a current of air.

14. The improved process of claim 12, in which the said cooling is effected by means of a current of air passing through the sintered mass.

15. In the manufacture of glassy materials capable of hydration with water to produce water-softening zeolites and derived from clay and alkali by fusion the improvement which comprises admixing the clay and the alkali with fine coke to form a dry, granular, pervious mass, locally igniting the mixture and passing air through such mass to form a travelling burning zone of high temperature, the temperature being sufficient to fuse together the clay and the alkali to a glass but the duration of high temperature being insufficient to permit said glass to flow to an extent substantially obviating perviousness of the mass.

16. In the manufacture of preparations for softening water the process which comprises forming a granulated mass, the several granules containing alumina, silica, and soda ash in proportions adapted to give a readily fusible, highly alkaline composition, mixing said granules with a fuel and heating the several granules individually to such a temperature and for such a time as to cause individual fusion of the granules without coalescence to a continuum, said heating being effected by burning said fuel in situ.

17. In the manufacture of preparations for softening water the process which comprises making a mixture of materials containing alumina and silica with soda ash, the soda ash being in excess of the amount required to make a glass, forming the mixture into pellets, mixing said pellets with a fuel, individually heating the pellets to form individual vitrified granules, said heating being effected by burning said fuel in situ and the heating being interrupted prior to substantial coalescence of the granules, cooling, separating the pellets and leaching out the excess of soda.

18. In the conversion of clay into a water softening material the process which comprises mixing clay and soda ash, forming the mixture into pellets, mixing said pellets with a fuel, and individually heating the pellets to such a temperature as to bake and harden the clay with a superficial attack by soda ash, said heating being effected by burning said fuel in situ, interrupting the heating before vitrification occurs, cooling and leaching out the caustic soda formed from the soda ash.

K. P. McELROY.